(12) United States Patent
Tanaka et al.

(10) Patent No.: US 12,526,498 B2
(45) Date of Patent: Jan. 13, 2026

(54) IMAGING APPARATUS WITH HEAT TRANSFER MEMBER

(71) Applicant: CANON KABUSHIKI KAISHA, Tokyo (JP)

(72) Inventors: Takuya Tanaka, Tokyo (JP); Kazuhiro Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 18/393,345

(22) Filed: Dec. 21, 2023

(65) Prior Publication Data

US 2024/0214656 A1 Jun. 27, 2024

(30) Foreign Application Priority Data

Dec. 27, 2022 (JP) ................................. 2022-210298

(51) Int. Cl.
*H04N 23/52* (2023.01)
*G03B 17/55* (2021.01)
(Continued)

(52) U.S. Cl.
CPC ............. *H04N 23/52* (2023.01); *G03B 17/55* (2013.01); *H04N 23/51* (2023.01); *H04N 23/54* (2023.01);
(Continued)

(58) Field of Classification Search
CPC ........ H04N 23/50; H04N 23/51; H04N 23/52; H04N 23/54; H04N 23/55; H04N 23/57; G03B 17/55; H05K 1/0203; H05K 1/021; H05K 7/2039; H05K 7/20136; H05K 7/20145; H05K 7/202
See application file for complete search history.

(56) References Cited

U.S. PATENT DOCUMENTS 5,508,740 A * 4/1996 Miyaguchi .............. H10F 77/50
348/E5.025
6,307,590 B1 * 10/2001 Yoshida ................. H04N 23/51
348/340
(Continued)

FOREIGN PATENT DOCUMENTS

JP 2007274288 A 10/2007
KR 101334664 B1 11/2013
KR 102264500 B1 * 6/2021 ............. H04N 23/50

*Primary Examiner* — Twyler L Haskins
*Assistant Examiner* — Akshay Trehan
(74) *Attorney, Agent, or Firm* — Canon U.S.A., Inc., IP Division

(57) ABSTRACT

An imaging apparatus includes an image sensor, a thermoelectric element thermally connected with the image sensor, a housing accommodating the image sensor and the thermoelectric element, having an opening at a position facing the image sensor, and thermally connected to the thermoelectric element, a light transmission member arranged on the opening of the housing to cover the opening of the housing, an attachment member configured to fix the light transmission member to the housing to attach the light transmission member to the housing, and a heat-transfer member arranged between the attachment member and the light transmission member or between the housing and the light transmission member and configured to transfer, to the light transmission member, heat transferred from the thermoelectric element to the housing.

14 Claims, 11 Drawing Sheets

(51) Int. Cl.
*H04N 23/51* (2023.01)
*H04N 23/54* (2023.01)
*H04N 23/57* (2023.01)
*H05K 1/02* (2006.01)
*H05K 7/20* (2006.01)

(52) U.S. Cl.
CPC ........... H04N 23/57 (2023.01); H05K 1/0203 (2013.01); H05K 1/021 (2013.01); H05K 7/2039 (2013.01); H05K 7/20136 (2013.01); H05K 7/20145 (2013.01); H05K 7/202 (2013.01)

(56) References Cited

U.S. PATENT DOCUMENTS

| | | | |
|---|---|---|---|
| 2004/0195676 A1* | 10/2004 | Quarre | H10F 77/60 |
| | | | 257/713 |
| 2015/0160536 A1* | 6/2015 | Lang | H04N 23/51 |
| | | | 348/374 |
| 2019/0289181 A1* | 9/2019 | Uetsuji | H04N 23/56 |
| 2022/0066121 A1 | 3/2022 | Lee | |

* cited by examiner ered in front of the
image sensor drops when the image sensor is cooled. When
the condensation occurs on the front window glass, the
quality of the captured images deteriorates.

Japanese Patent Application Laid-open No. 2007-274288
discusses a technique of preventing the condensation from
occurring on the image sensor side of the front window
glass, by placing the image sensor in a hermetically sealed
space to prevent moisture from entering into the hermetically sealed space. Japanese Patent Application Laid-open
No. 2007-274288 further describes a technique of preventing the condensation from occurring on the object side by
employing a double pane structure in the front window glass
to enhance the thermal insulation performance and prevent
the temperature of the front window glass on the object side
from dropping.

IMAGING APPARATUS WITH HEAT TRANSFER MEMBER

BACKGROUND

Field

The present disclosure relates to an imaging apparatus.

Description of the Related Art

In general, an image sensor of an imaging apparatus generates dark current as the temperature rises, and noise increases. The noise caused by the dark current deteriorates the quality of captured images, especially images captured for the purpose of monitoring during the night and images captured in dark places. To prevent the deterioration in the quality of the captured images, known imaging apparatus are arranged to capture images whilst cooling the image sensor using a cooling means, such as a Peltier element.

Further, in certain situations condensation occurs on the image sensor side, and the object side of a front window glass, because the temperature of the front window glass (e.g., a light transmission member) arranged in front of the image sensor drops when the image sensor is cooled. When the condensation occurs on the front window glass, the quality of the captured images deteriorates.

SUMMARY

According to an aspect of the present disclosure, an imaging apparatus includes an image sensor, a thermoelectric element thermally connected with the image sensor, a housing accommodating the image sensor and the thermoelectric element, having an opening at a position facing the image sensor, and thermally connected to the thermoelectric element, a light transmission member arranged on the opening of the housing to cover the opening of the housing, an attachment member configured to fix the light transmission member to the housing to attach the light transmission member to the housing, and a heat-transfer member arranged between the attachment member and the light transmission member or between the housing and the light transmission member and configured to transfer, to the light transmission member, heat transferred from the thermoelectric element to the housing.

Further features of the disclosure will become apparent from the following description of exemplary embodiments with reference to the attached drawings.

DESCRIPTION OF THE EMBODIMENTS

Figure 1:
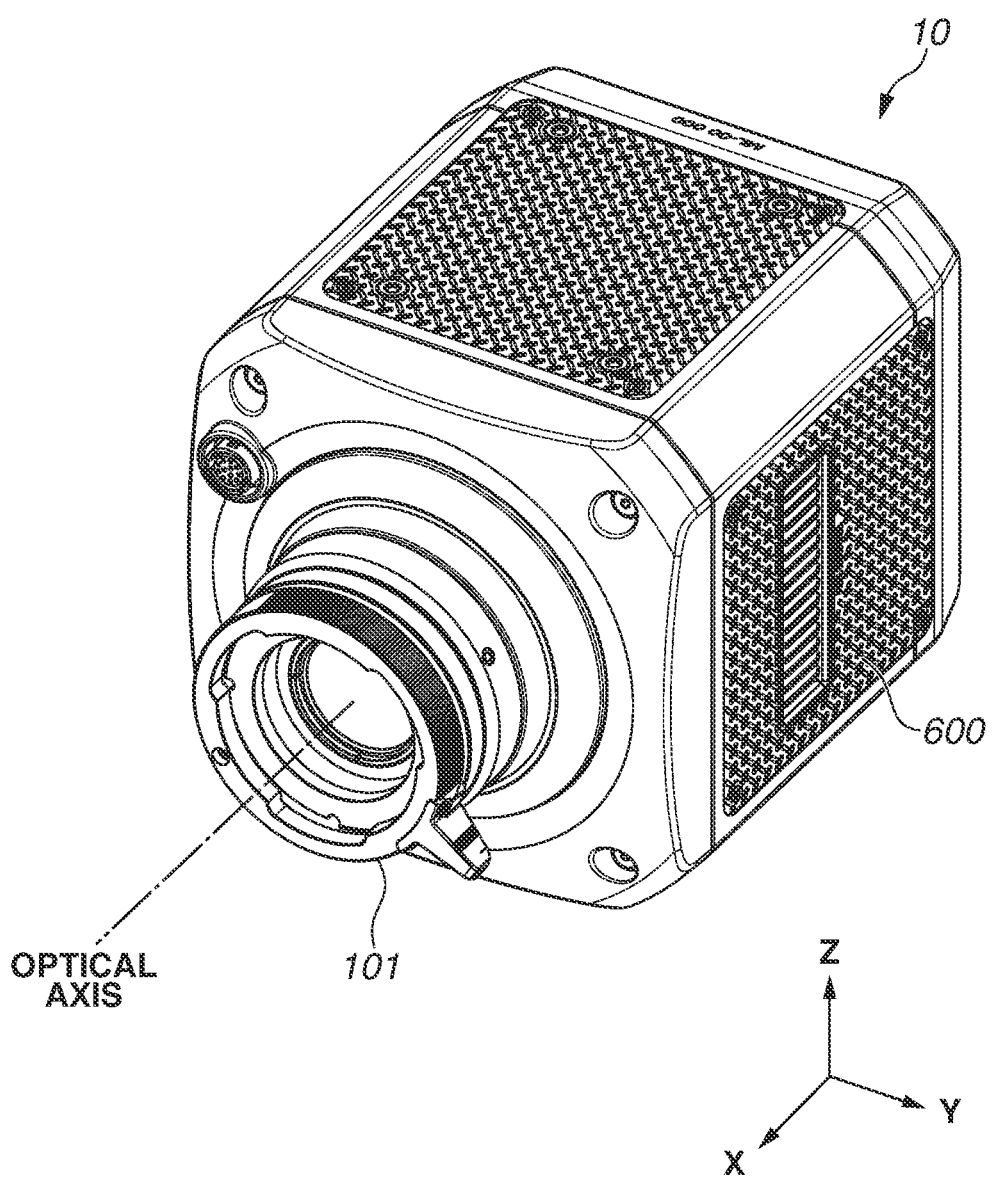
FIG. 1 is a diagram illustrating an external appearance of an imaging apparatus according to a first embodiment of the present invention.

Hereinbelow, embodiments of the present disclosure will be described in detail. Note that the embodiments described below are not intended to limit the scope of the present disclosure, and not all the combinations of the features described in the embodiments are necessarily essential for the solution of the present disclosure. The configurations of the embodiments can be modified and changed as appropriate depending on specifications and various conditions (e.g., different use conditions and use environments) of apparatuses to which the present disclosure is applied. The technical scope of the present disclosure is determined by the scope of claims, and not limited by any one of the following individual embodiments. Further, parts of the respective embodiments may be combined as appropriate. In all the drawings, components having the same functions are assigned the same reference numerals and symbols, and the descriptions thereof are not repeated.

Figure 2:
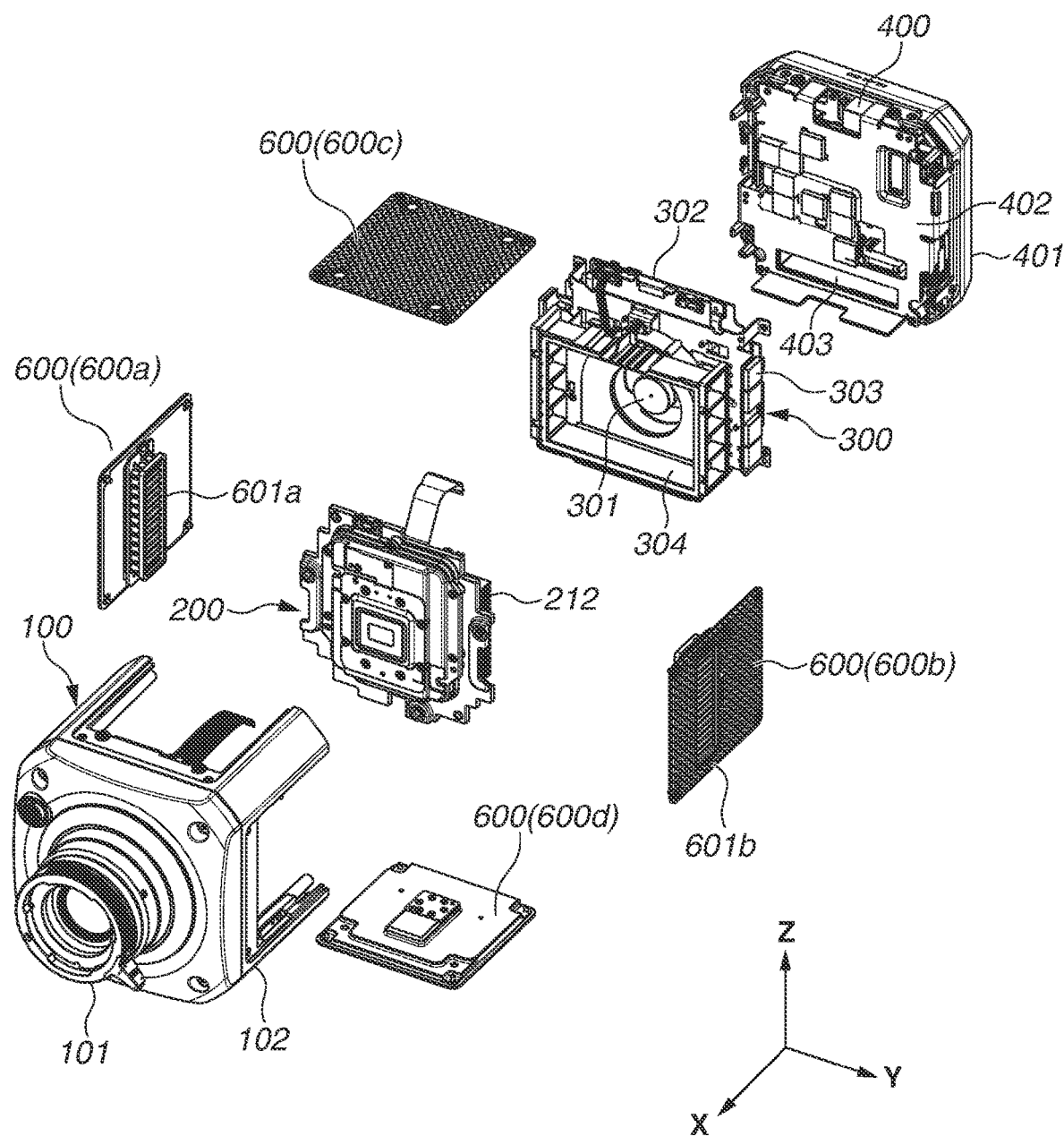
FIG. 2 is an exploded diagram illustrating a schematic configuration of a camera unit in the imaging apparatus illustrated in FIG. 1.

With reference to FIGS. 1 and 2, a schematic configuration of a main body of an imaging apparatus 10 according to a first embodiment will be described. The imaging apparatus 10 according to the present embodiment is a lens interchangeable type camera in which the installed lens (not illustrated) can be replaced with another lens. In the following description, an optical axis direction of the imaging apparatus 10 may be also referred to as an X direction, and a width direction as a Y direction, and a height direction as a Z direction.

The imaging apparatus 10 includes a mount unit 100, a Peltier unit 200, a duct unit 300, a rear unit 400, and exterior panels 600. The exterior panels 600 include an exterior panel 600a on the right side, an exterior panel 600b on the left side, an exterior panel 600c on the upper side, and an exterior panel 600d on the lower side. The exterior panel 600a on the right side includes an opening 601a, and the exterior panel 600b on the left side includes an opening 601b. In addition, in the following description, the four exterior panels 600a to 600d may be simply referred to as the exterior panels 600.

The mount unit 100 includes a mount structure 101, to which a known interchangeable lens (not illustrated) can be attached, and a metallic base member 102 supporting the mount structure 101.

A user can mount various types of interchangeable lenses on the mount structure 101 depending on an object and an imaging environment, and the user can also remove the lens from the mount structure 101 to replace it with another lens. In addition, since the mount structure 101 for an interchangeable lens is publicly known, the description thereof is omitted.

The Peltier unit 200 includes therein an image sensor 250 (see FIG. 5), an optical system, and the like, and can be attached (e.g., fixed) to the mount unit 100. The Peltier unit 200 may also be referred to as a sensor Peltier unit 200. Along the optical axis illustrated in FIG. 1, light that has entered the interchangeable lens and the mount unit 100 is guided to the image sensor 250. The light received by the image sensor 250 is converted into digital data, and the digital data is image-processed by the rear unit 400 described below.

The Peltier unit 200 includes a heat dissipation fin 212. The internal configuration of the Peltier unit 200 will be described below. The image sensor 250 may also be referred to as an imaging device.

The duct unit 300 includes at least a fan 301, a control circuit board 302, a supporting structure 303 that supports the fan 301 and the control circuit board 302, and a duct portion 304.

The duct unit 300 has a configuration that allows the external air to be taken in and the internal air to be discharged to the outside through the openings 601a and 601b of the exterior panels 600, and an opening 403 of the rear unit 400. The supporting structure 303 is configured such that the Peltier unit 200 is cooled by the air flowing inside the imaging apparatus 10, when the external air (e.g., gas) is taken in or the internal air is discharged.

The rear unit 400 includes a metallic base part 401 and a circuit board 402 on which at least one cable connector and one switch are mounted. By connecting the imaging apparatus 10 to an external apparatus via the cable connector, data (e.g., image data and video) captured by the imaging apparatus 10 can be browsed and/or stored. Further, the main body of the imaging apparatus 10 can be controlled by using the external apparatus connected via the cable connector and the switch. The base part 401 is formed of an aluminium diecast so as to have enough strength to support and fix the switch and the connector.

The exterior panels 600 (e.g., comprising at least one of 600a to 600d) are each formed of a flat metal sheet or a metal member, and can be attached to and detached from the mount unit 100 and the rear unit 400. The exterior panels 600a and 600b include the openings 601a and 601b, respectively, for air suction. For example, the fan 301 of the duct unit 300 can be operated to draw outside air into the main body of the imaging apparatus 10 through the openings 601a and 601b. The rear unit 400 includes the opening 403 for discharging air, and can discharge the air inside the main body of the imaging apparatus 10 to the outside by being connected with the duct unit 300. The internal components (Peltier unit 200 and duct unit 300 of the imaging apparatus 10 between the mount unit 100 and the rear unit 400) are covered by the exterior panels 600, and the imaging apparatus 10 is thus complete.

Figure 3:
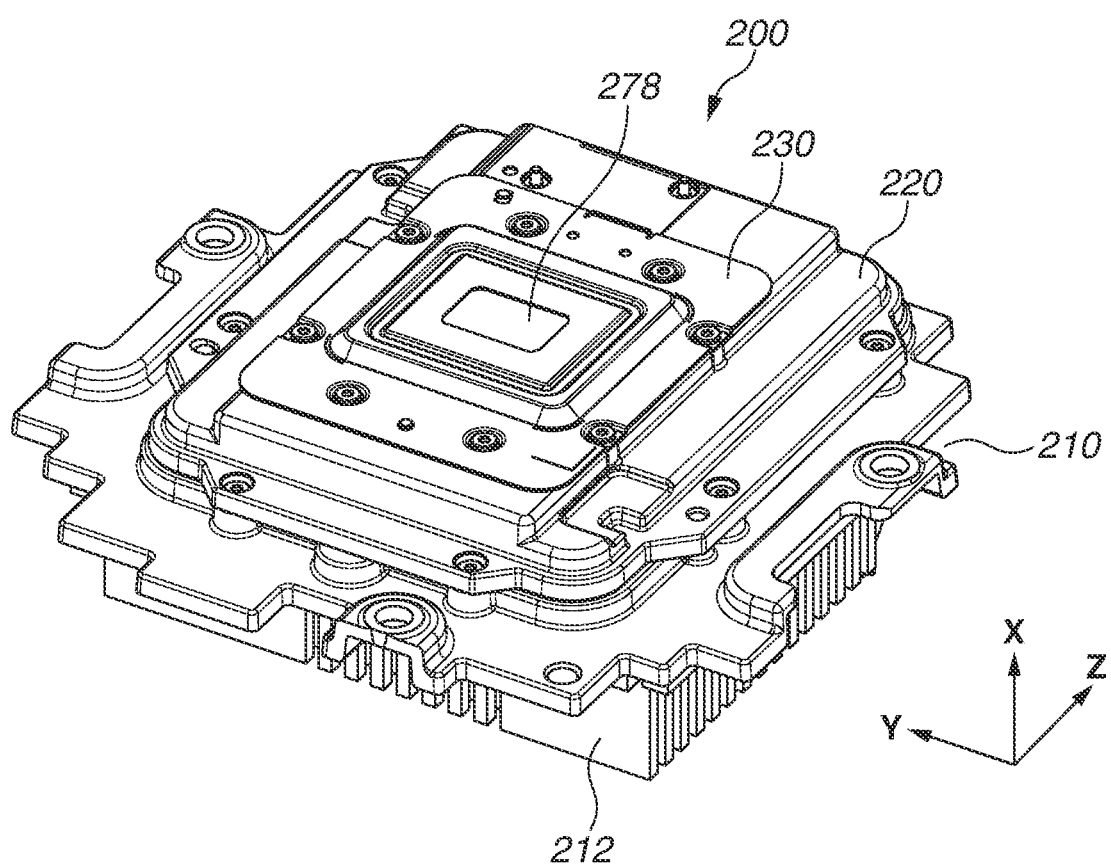
FIG. 3 is a perspective diagram illustrating an external of a Peltier unit of the imaging apparatus illustrated in FIG. 1.
Figure 4:
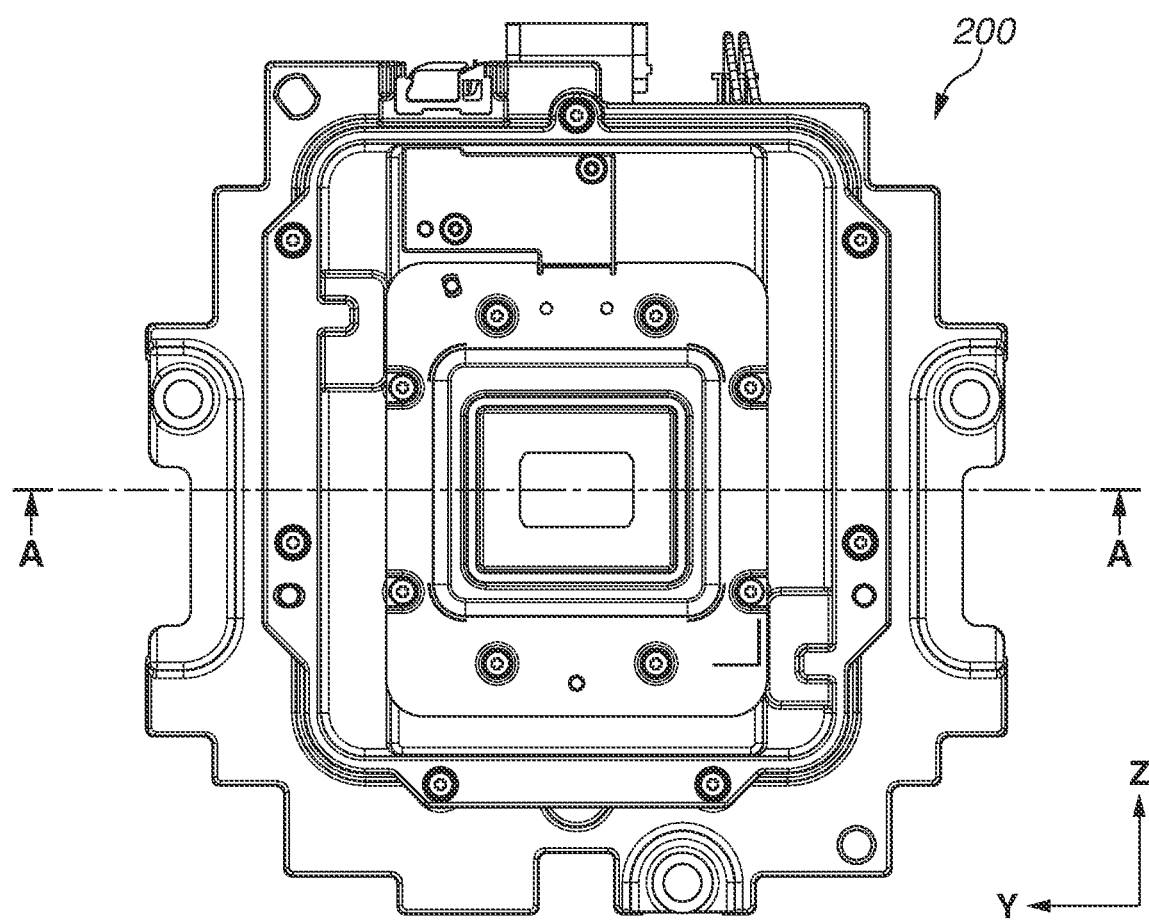
FIG. 4 is a diagram illustrating a front view of the Peltier unit of the imaging apparatus illustrated in FIG. 3.
Figure 5:
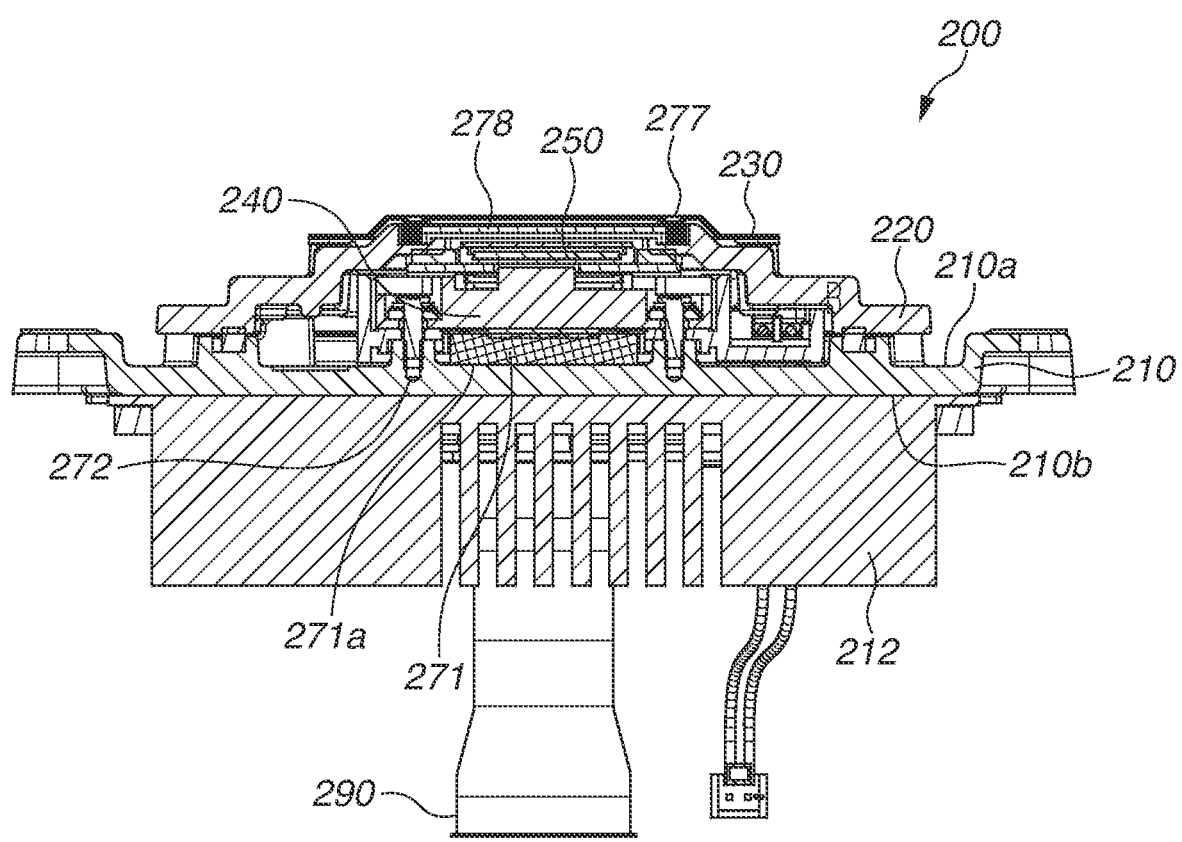
FIG. 5 is a cross-section diagram illustrating a schematic configuration of the Peltier unit illustrated in FIG. 4.
Figure 6:
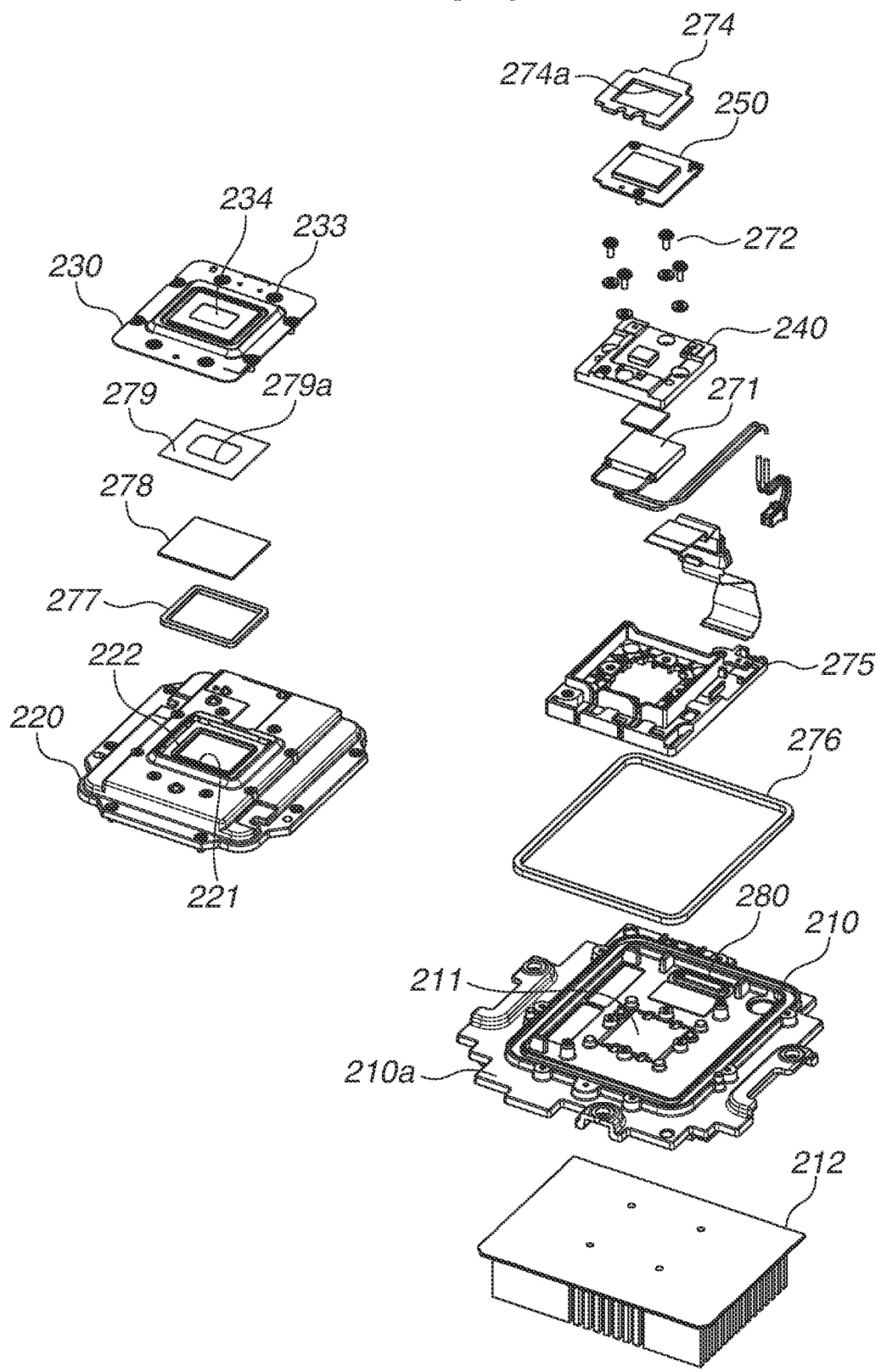
FIG. 6 is an exploded diagram illustrating a schematic configuration of the Peltier unit illustrated in FIG. 3.
Figure 7:
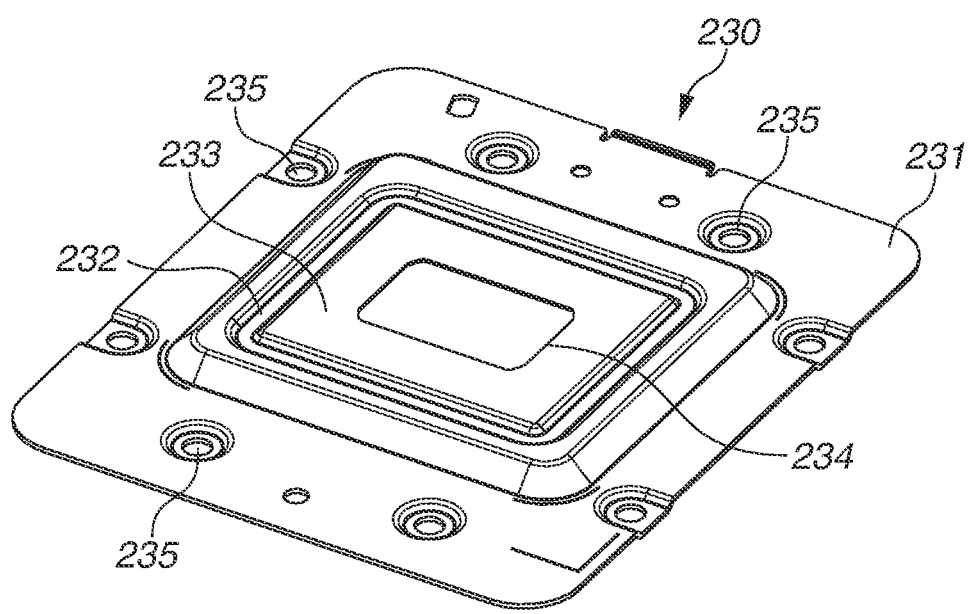
FIG. 7 is a perspective diagram illustrating a pressing member of the Peltier unit illustrated in FIG. 3, when viewed from a front side.
Figure 8:
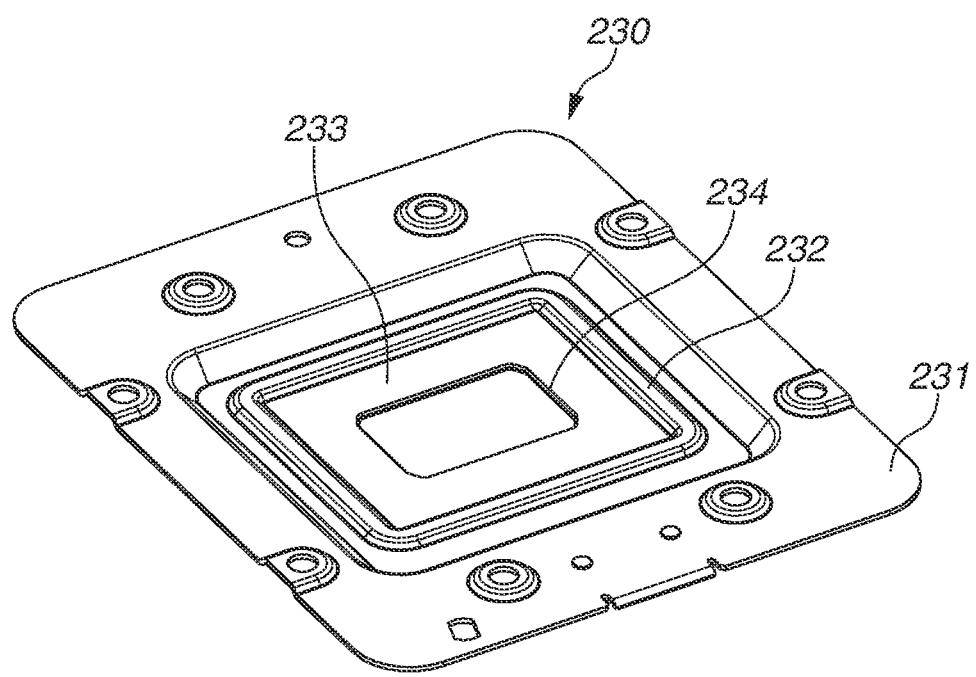
FIG. 8 is a perspective diagram illustrating the pressing member of the Peltier unit illustrated in FIG. 3, when viewed from a back side.
Figure 9:
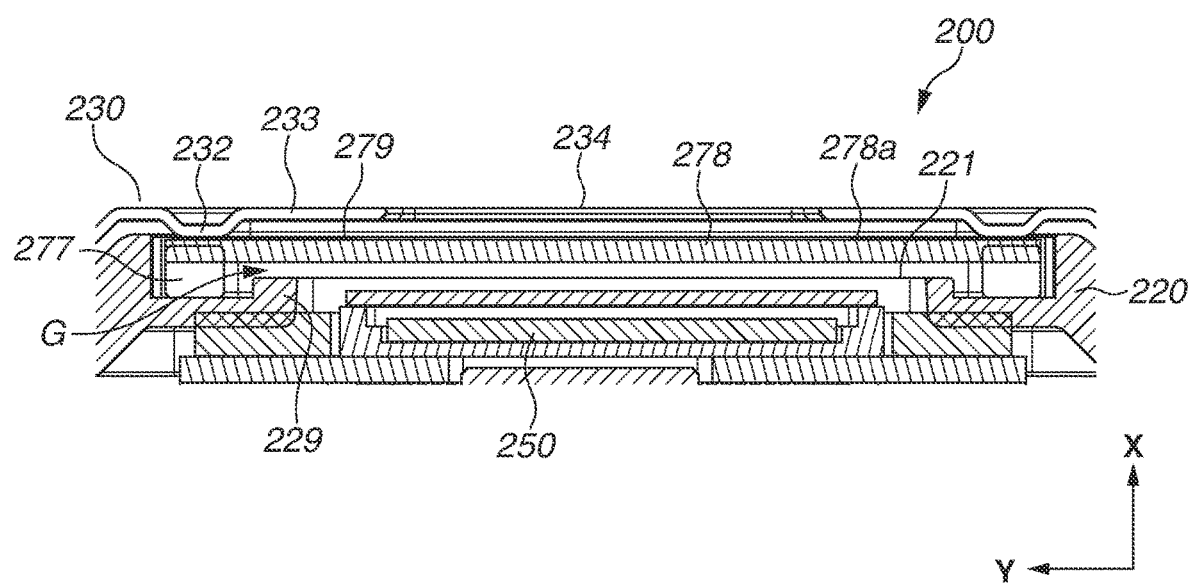
FIG. 9 is an enlarged view illustrating a cross-section of a portion around a front window glass of the Peltier unit illustrated in FIG. 5.

Next, with reference to FIGS. 3 to 9, a configuration of the Peltier unit 200 will be described. FIG. 3 is a perspective diagram illustrating an external appearance of the Peltier unit 200 viewed from the front side of the imaging apparatus 10, and FIG. 4 is a front view of the Peltier unit 200. FIG. 5 is an arrow cross-section diagram illustrating a configuration of the Peltier unit 200 cut along a dashed-dotted line A-A in FIG. 4. FIG. 6 is an exploded diagram of the Peltier unit 200 illustrated in FIG. 3. FIG. 7 is a perspective diagram illustrating a pressing member 230 of the Peltier unit 200 when viewed from the front side. FIG. 8 is a perspective diagram illustrating the pressing member 230 of the Peltier unit 200 when viewed from the back side. FIG. 9 is an enlarged view illustrating a portion of the Peltier unit 200 around a front window glass 278 in the cross-section diagram illustrated in FIG. 5.

The Peltier unit 200 is approximately cuboid in shape with a closed hollow (e.g., cavity) formed inside. The Peltier unit 200 includes a top cover (e.g., front cover) 220, a bottom cover (e.g., rear cover) 210 located behind the top cover 220, and the front window glass 278 attached to the top cover 220. The front window glass 278 may be referred to as a glass member. The top cover 220 and the front window glass 278 face the bottom cover 210 across the hollow. The top cover 220 is a member (e.g., a solid member) having an approximately trapezoidal shape in the vertical cross-section (see FIG. 5) and having a predetermined thickness, and the top cover 220 further has openings in respective two surfaces (e.g., the front and back surfaces) facing in the thickness direction. The bottom cover 210 functions as a cover on the back surface side of the top cover 220 (i.e., which covers the opening on the back surface side). The front window glass 278 functions as a cover for an opening 221 on the front surface side of the top cover 220. More specifically, the front window glass 278 is provided (i.e., arranged) to cover the opening 221 on the front surface side of the top cover 220. The bottom cover 210 is provided to cover the opening on the back surface side of the top cover 220. A hermetically sealed space (e.g., defined by a hermetically sealed housing) is formed by the top cover 220, the bottom cover 210, and the front window glass 278 (e.g., the housing which defines the hermetically sealed space comprises the top cover 220, the bottom cover 210 and the front window glass 278). Inside the hermetically sealed space, the image sensor 250 and a Peltier element 271 (described below) are provided (e.g., contained). The hermetically sealed housing is thermally connected to the Peltier element 271. The Peltier element 271 is an element for cooling the image sensor 250. The Peltier element 271 is thermally connected to the image sensor 250. When power is supplied to the Peltier element 271, the Peltier element 271 functions as a cooling device. The Peltier element 271 is a thermoelectric element. The Peltier element 271 includes a cooling surface and a heat dissipation surface 271a (see FIG. 5). The cooling surface is a surface located on the opposite side of the heat dissipation surface 271a. The top cover 220 and the bottom cover 210 are made of metal.

The bottom cover 210 is a flat plate part and includes a front surface 210a and a back surface 210b.

The bottom cover 210 includes a Peltier element mounting portion 211 to which the heat dissipation surface 271a of the Peltier element 271 is to be mounted at an approximate center of the front surface 210a. The Peltier element mounting portion 211 is a flat portion. The heat dissipation fin 212 is provided on the back surface 210b of the bottom cover 210. The heat dissipation fin 212 is housed in the duct portion 304 of the duct unit 300. With this configuration, the heat transferred from the Peltier element 271 to the bottom cover 210 and the heat dissipation fin 212 is discharged outside by the air in the duct portion 304 (see FIG. 2). The bottom cover 210 includes a through-hole 280 on the side of the Peltier element mounting portion 211. A signal line 290 for the Peltier element 271 and the image sensor 250 extends outside the Peltier unit 200 via the through-hole 280. Thus, the signal line 290 can be drawn to the outside while maintaining the sealability of the Peltier unit 200. The gap between the signal line 290 and the through-hole 280 of the bottom cover 210 is sealed by an elastic member, such as rubber, or an adhesive material.

The material of the bottom cover 210 is desirably a metal (e.g., an aluminium alloy) which is high in sealability and thermal conductivity. For example, the bottom cover 210 may be formed of a material that is substantially gas impermeable, and sufficiently rigid so as to enable a compression seal to be formed with another element of the housing, thereby improving the sealability of the Peltier unit 200. Further, the Peltier element mounting portion 211 is desirably a surface having high flatness and low surface roughness in order to efficiently transfer the heat of the Peltier element 271 to the bottom cover 210 (and/or increase the sealability of the of the Peltier unit 200).

The Peltier element 271 for cooling the image sensor 250 is arranged in such a manner that the heat dissipation surface 271a of the Peltier element 271 is in contact with the Peltier element mounting portion 211 formed on the front surface 210a of the bottom cover 210. The signal line 290 for supplying power to the Peltier element 271 is connected to the control circuit board 302 via the through-hole 280.

A cooling block 240 is approximately cuboid in shape and is a solid component with a size larger than the Peltier element 271 (e.g., at least one dimension of the cooling block 240 is greater than the largest dimension of the Peltier element 271). The back surface of the cooling block 240 is fastened to the bottom cover 210 with a plurality of fastener members 272 arranged around the Peltier element 271 in a state where the back surface of the cooling block 240 is arranged in contact with the cooling surface (e.g., front surface) of the Peltier element 271. In other words, the Peltier element 271 is held by the cooling block 240 and the bottom cover 210 therebetween. The fastener members 272 are, for example, screws.

The image sensor 250 is mounted (e.g., fixed) on the front surface of the cooling block 240, which is the surface on the opposite side of the cooling block 240 to the surface in contact with the Peltier element 271. With this configuration, when the temperature of the cooling surface of the Peltier element 271 drops, the heat of the image sensor 250 transfers to the Peltier element 271 via the cooling block 240, so that the temperature of the image sensor 250 can be dropped.

The cooling block 240 is made of an aluminium alloy or the like with high thermal conductivity to efficiently transfer the heat of the image sensor 250 to the cooling surface of the Peltier element 271. Further, to prevent the heat of the bottom cover 210 from transferring to the cooling block 240 via the fastener members 272, at least some of the fastener members 272 (e.g., a predetermined number of the fastener members 272) are desirably made of a heat insulation material such as resin. More desirably, to prevent the heat of the bottom cover 210 from transferring to the cooling block 240 via the air inside the hermetically sealed space, a thermal insulation member made of resin or urethane is arranged to cover at least a part of the cooling block 240.

The cooling block 240 and the Peltier element 271 are supported (e.g., held) by (and/or attached (e.g., fixed) to) a support member 275.

A sensor rubber 274 having an approximately rectangular shape and including an opening 274a is arranged around the image sensor 250. The sensor rubber 274 prevents dust in the hermetically sealed space of the Peltier unit 200 from adhering to the imaging surface of the image sensor 250.

The top cover 220 is a hollow component having openings in two surfaces facing each other, and a hermetically sealed housing is formed by attaching (e.g., fixing) the top cover 220 to the bottom cover 210. The material of the top cover 220 is a metal such as an aluminium alloy which is high in sealability and thermal conductivity. A rectangular groove 222 is formed around the opening 221 on the mount unit 100 side of the top cover 220. The groove 222 is located in an inner flange portion 229 of the top cover 220. In the groove 222, a window portion seal member 277 having a shape approximately the same as the groove 222 is provided. The window portion seal member 277 comprises an elastic material (e.g., an elastic body or member) such as rubber. More desirably, the window portion seal member 277 is made of butyl rubber or fluoro rubber high in impermeability and sealability. There is a gap G between the inner flange portion 229 and the front window glass 278.

The rectangular window portion seal member 277 is arranged around the rectangular front window glass 278 serving as an optical member. The window portion seal member 277 has a shape that does not interrupt the incidence of light onto the image sensor 250. The front window glass 278 is made of a substantially transparent material such as transparent glass, so that the light incident from the mount unit 100 can be transferred to the image sensor 250. The front window glass 278 may also be referred to as a light transmission member or a transparent member.

A graphite sheet 279 serving as a heat-conductive member is attached and fixed onto the front surface of the front window glass 278 (e.g., the surface of the front glass window 278 arranged opposite to the image sensor 250). The graphite sheet 279 has an approximately the same external form as that of the front window glass 278, and includes an opening 279a to allow the light incident to the front window glass 278 to pass. In addition, the heat-conductive member may also be referred to as a heat-transfer member.

The pressing member 230 is made of a metal or the like (e.g., a metal sheet), and the pressing member 230 is attached (e.g., fixed) to the top cover 220 while pressing the graphite sheet 279, the front window glass 278, and the window portion seal member 277. In other words, the graphite sheet 279, the front window glass 278, and the window portion seal member 277 are pressed and held by the top cover 220 and the pressing member 230 therebetween.

The pressing member 230 is fixed to the top cover 220 with, for example, screws. In the peripheral portion of the pressing member 230, six screw holes 235 are formed.

FIG. 7 is a perspective view of the pressing member 230 viewed from the front side, and FIG. 8 is a perspective view of the pressing member 230 viewed from the back side. The pressing member 230 includes a base portion 231 to be attached to the top cover 220, a pressing portion 232 pressing the front window glass 278, and an opening 234 for allowing the light incident to the front window glass 278 to pass therethrough. The pressing portion 232 is a contact portion in contact with the graphite sheet 279. As illustrated in FIG. 8, the pressing portion 232 is constituted by protruding portion (protruding to −X direction) having an approximately rectangular shape in its external form. A planar portion 233 is formed between the opening 234 and the pressing portion 232. The pressing member 230 is arranged so as to press the front surface of the front window glass 278. When the pressing member 230 is fixed to the top cover 220, the pressing portion 232 presses the front window glass 278 and the window portion seal member 277 to the top cover 220 via the graphite sheet 279. The pressing portion 232 is located on the surface of the side of the front window glass 278 that is opposite to the surface on the side of the front window glass 278 where the window portion seal member 277 is arranged. The pressing member 230 may also be referred to as an attaching member for attaching the front window glass 278 to the top cover 220. The opening 234 of the front window glass 278 may also be referred to as a light incident opening to allow incidence of light to the image sensor 250.

The material of the pressing member 230 is desirably a metal alloy (e.g., a metal alloy sheet), such as an aluminium metal sheet or a stainless-steel metal sheet having enough strength to hold the front window glass 278 and the window portion seal member 277.

The top cover 220 is attached (e.g., fixed) to the bottom cover 210 with a base portion seal member 276 therebetween such that the base portion seal member 276 is pressed and held by the top cover 220 and the bottom cover 210 therebetween, whereby the Peltier unit 200 is assembled in a hermetic manner. The base portion seal member 276 is made of an elastic body (elastic member), such as butyl rubber or fluoro rubber, having enough sealability to keep the Peltier unit 200 in a hermetic state.

With the technique discussed in Japanese Patent Application Laid-open No. 2007-274288, at least two front window glasses are required on the object side of the image sensor, and a gap serving as a heat insulating layer is arranged between the two front window glasses. Accordingly, the imaging apparatus becomes larger in size because a space for the at least two front window glasses and the gap is required in front of the image sensor (i.e., imaging device).

A description will be given of a mechanism (e.g., configuration) for preventing condensation on the front window glass 278, without increasing the size of the imaging apparatus 10.

As described above, in the imaging apparatus 10 according to the present embodiment, the image sensor 250, the cooling block 240, and the Peltier element 271 are attached (e.g., fixed) to the bottom cover 210 so as to be able to transfer heat (e.g., each one of the image sensor 250, the cooling block 240 and the Peltier element 271 are thermically coupled to the bottom cover 210). Similarly, the imaging apparatus 10 is configured (e.g., arranged) so that heat can be transferred from the bottom cover 210 to the top cover 220, the pressing member 230, the graphite sheet 279, and the front window glass 278. When power is supplied to the Peltier element 271, the temperature of the cooling surface (e.g., the contact surface in contact with the cooling block 240) of the Peltier element 271 drops, and the temperature of the cooling block 240 drops. As a result, the temperature of the image sensor 250 can be decreased. Further, when power is supplied to the Peltier element 271, the temperature of the heat dissipation surface 271a of the Peltier element 271 rises. The heat generated on the heat dissipation surface 271a of the Peltier element 271 is transferred to the metallic bottom cover 210, the metallic top cover 220, and the metallic pressing member 230. The heat having transferred to the pressing member 230 transfers to the front window glass 278 via the graphite sheet 279. Since the heat having transferred to the front window glass 278 heats the front window glass 278, it is possible to prevent the temperature of the front window glass 278 from dropping, and condensation from occurring on the object side surface (e.g., front surface) of the front window glass 278.

On the other hand, the metallic top cover 220, the metallic bottom cover 210, and the front window glass 278 form a hermetically sealed housing of the Peltier unit 200. The window portion seal member 277 is arranged between the top cover 220 and the front window glass 278 to form a secure seal therebetween. Similarly, the base portion seal member 276 is arranged between the bottom cover 210 and the top cover 220 so as to form a secure seal therebetween. In this way, external moisture is substantially prohibited from enter into the hermetically sealed housing (e.g., of the Peltier unit 200), so that it is possible to prevent the occurrence of condensation on the back surface of the front window glass 278 (e.g., the surface of the front window glass 278 facing the image sensor 250). Further, since the Peltier unit 200 according to the present embodiment includes only one front window glass, it is possible to suppress an increase in size of the imaging apparatus.

In the present embodiment, the occurrence of condensation on the front window glass 278 is prevented by transferring heat efficiently to the front window glass 278 using the graphite sheet 279. In the present embodiment, the thickness of the graphite sheet 279 is, for example, around several tens of micrometers (e.g., less than a hundred micrometers). On the other hand, in the conventional configuration using a double pane window for preventing condensation, at least the front window glass has a thickness of around several hundreds of micrometers (e.g., at least two hundred micrometers) and a space between the individual panes of the double pane window are required (e.g., the thickness of the double pane window is much greater than that of the graphite sheet 279 according to the present disclosure). Thus, the configuration according to the present embodiment can reduce the size of the front window glass 278 in the thickness direction (X direction) as compared with the configuration using the double pane window.

It is desirable to use a graphite sheet as a heat-transfer member for transferring the heat to the front window glass 278, and by using the graphite sheet, the heat is allowed to transfer to the front window glass 278 in the surface direction more efficiently (e.g., in a direction substantially towards the front window glass 278), so that it is possible to prevent condensation without increasing the thickness (e.g., the dimension or size in the X direction) of the Peltier unit 200 as much as possible. Further, the heat-transfer member for transferring heat to the front window glass 278 may be formed of a thermally conductive material (e.g., a metallic plate comprising copper and the like) provided that the material has a higher thermal conductivity, in the surface direction, than that of the front window glass 278, and so long as the heat-transfer member has a thickness, in the optical axis direction, which is lower than that of the front window glass 278.

As described above, the pressing portion 232 of the pressing member 230 presses the front surface 278a (e.g., opposite to the surface close to the image sensor 250) of the front window glass 278. Desirably, the external form of the pressing portion 232 is configured to be approximately coincident with that of the window portion seal member 277, and the pressing portion 232 is arranged to press the front window glass 278 at a same portion where the window portion seal member 277 presses the front window glass 278 from the opposite side. In this case, when viewed in the X direction, the pressing portion 232 almost overlaps (e.g., aligns with) the window portion seal member 277 via the front window glass 278 and the graphite sheet 279. In this way, since the pressing member 230 can press the front window glass 278 stronger while preventing the front window glass 278 from being broken when the front window glass 278 is pressed by the pressing member 230, the heat-transfer efficiency from the pressing member 230 to the graphite sheet 279 can be improved. According to the present disclosure, at least one (or each) of the pressing portion 232, the window portion seal member 277, and the graphite sheet 279 may be configured to substantially align, in the X direction, with at least one (or each) of the other respective components. In embodiments, at least one (or each) of the components may be slightly offset from the other respective components (e.g., as shown in FIG. 9). For example, a part of at least one of the components may be misaligned with a part of the other components. In a situation where at least one of the components is configured with an annular construction, the central axis of the at least one component may be substantially (e.g., completely) aligned with at least one of the other components. However, a part of the at least one component may be slightly misaligned with a corresponding part of one of the other components. As shown in FIG. 9, the central axes of the window portion seal member 277, the graphite sheet 279, and the pressing portion 232 are substantially aligned (i.e., in the X direction), but the outer edge of the window portion seal member 277 extends, in the Y-direction, slightly beyond the outer edge of the overlapping portion of the pressing portion 232. In this way, the window portion seal member 277 and the pressing portion 232 do not completely overlap with one another.

Further, the graphite sheet 279 is desirably configured to extend from the pressing portion 232 of the pressing member 230 towards the center direction (i.e., direction perpendicular to the optical axis or direction toward the optical axis) of the image sensor 250. Thus, the graphite sheet 279 extends from the window portion seal member 277 to a position near the optical axis of the image sensor 250. With this configuration, heat can be transferred via the graphite sheet 279 to a position near the center of the front window glass 278 where the temperature most decreases when the image sensor 250 is cooled by the Peltier element 271. Accordingly, it is possible to prevent condensation more easily. More desirably, the graphite sheet 279 extends to a position at which the opening 234 of the pressing member 230 and the opening 279*a* of the graphite sheet 279 approximately coincide with each other. With this configuration, it is possible to efficiently heat the vicinity of the center of the front window glass 278 without obstructing the optical path of the light passing through the opening 234 of the pressing member 230 extending from the mount unit 100 to the image sensor 250.

As described above, according to the present embodiment, it is possible to prevent the occurrence of condensation on the front window glass 278 facing the image sensor (e.g., imaging device) 250 without increasing the size of the imaging apparatus 10. If the image sensor 250 is cooled using the Peltier element 271, the temperature of the front window glass 278 also drops, and condensation may easily occur on the front surface 278*a* of the front window glass 278. Since the configuration according to the present embodiment can transfer heat to the front window glass 278, the condensation does not easily occur on the front surface 278*a* of the front window glass 278.

Next, with reference to FIG. 10, the imaging apparatus 10 including a Peltier unit 200A according to a second embodiment of the present disclosure will be described. The second embodiment is different from the first embodiment in the structure near a front window glass 778 of the Peltier unit 200A. The front window glass 778 includes a front surface 778*a* and a back surface 778*b*. In the following descriptions, points different from the first embodiment will be described. In embodiments, the top cover 720 is made of an aluminium alloy. In addition, the top cover 720 in FIG. 10 corresponds to the top cover 220 in FIG. 9. A pressing member 730 in FIG. 10 corresponds to the pressing member 230 in FIG. 9. A window portion seal member 777 in FIG. 10 corresponds to the window portion seal member 277 in FIG. 9. The front window glass 778 in FIG. 10 corresponds to the front window glass 278 in FIG. 9. An image sensor 750 in FIG. 10 corresponds to the image sensor 250 in FIG. 9. An inner flange portion 729 in FIG. 10 corresponds to the inner flange portion 229 in FIG. 9. Materials and shapes of respective components and members are the same as those in the first embodiment, unless otherwise specified in the following descriptions. For example, the window portion seal member 777 is desirably made of an elastic material (e.g., an elastic member or body) such as rubber. More desirably, the window portion seal member 777 is made of butyl rubber or fluoro rubber configured with high impermeability and sealability. The window portion seal member 777 may be made of high thermal conductive elastomer. A first heat-transfer member 790 and a second heat-transfer member 779 are each arranged at a position nearer to the optical axis of the image sensor 750 than the window portion seal member 777.

Figure 10:
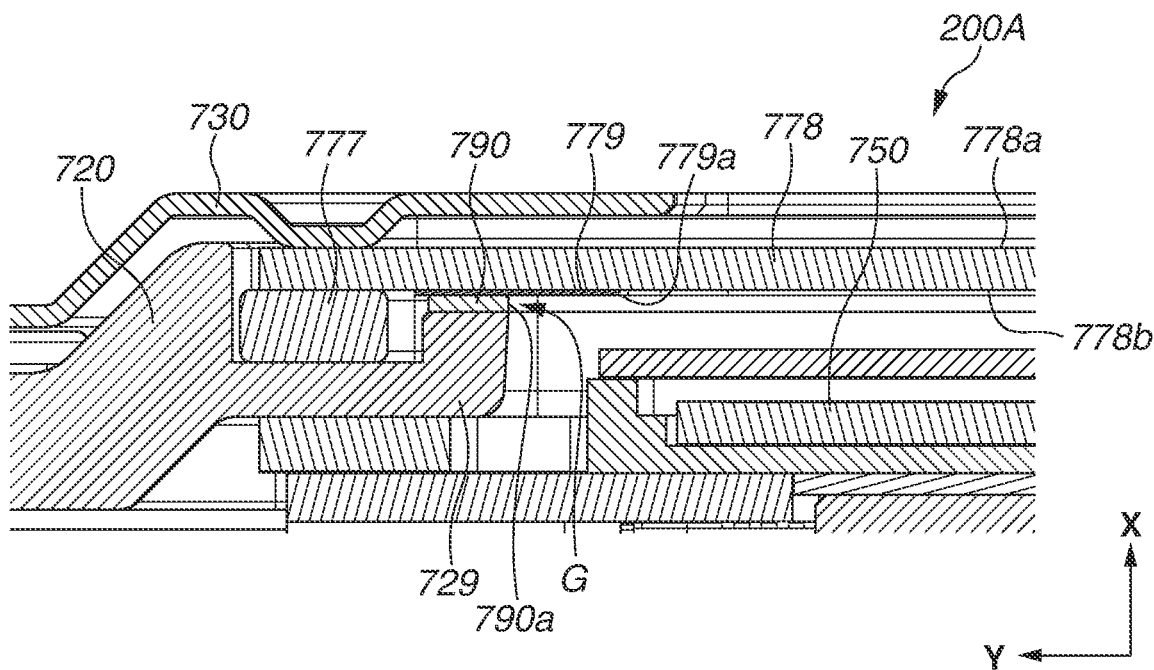
FIG. 10 is an enlarged view illustrating a cross-section of a portion around a front window glass of a Peltier unit according to a second embodiment.

FIG. 10 is an enlarged cross-section diagram illustrating a portion around the front window glass 778 of the Peltier unit 200A, and corresponds to FIG. 9 according to the first embodiment. The first embodiment is configured so that the heat is transferred to the top cover 220, the pressing member 230, the graphite sheet 279, and the front window glass 278. In the present embodiment, heat is transferred from the top cover 720 to the back surface 778*b* of the front window glass 778 via the two heat-transfer members 790 and 779, different from the first embodiment in which the heat is transferred from the pressing member 230 to the front surface 278*a* of the front window glass 278 via the heat-transfer member (e.g., graphite sheet 279). As illustrated in FIG. 10, the first heat-transfer member 790 and the second heat-transfer member 779 are provided so as to fill the gap G formed between the inner flange portion 729 of the top cover 720 and the front window glass 778. That is, in the present embodiment, the heat is transferred from the top cover 720 to the back surface 778*b* of the front window glass 778 via the first heat-transfer member 790 and the second heat-transfer member 779. The first heat-transfer member 790 may be heat dissipation grease or a heat dissipation sheet. The second heat-transfer member 779 is a graphite sheet. The size of the second heat-transfer member 779 in the Y direction is larger than that of the first heat-transfer member 790 in the Y direction. More specifically, an inner end 779*a* of the second heat-transfer member 779 extends towards the center direction of the Peltier unit 200A farther than an inner end 790*a* of the first heat-transfer member 790. With this configuration, the area of the second heat-transfer member 779 in contact with the front window glass 778 is made to be large.

To make the pressing member 730 thin and highly strong, the material of the pressing member 730 comprises a material which is configured with a thermal conductivity which is lower than that of the top cover 720. For example, the pressing member may comprise iron or stainless steel which has a thermal conductivity less than the aluminium alloy from which the top cover 720 is formed. The front window glass 778 can be efficiently heated by the configuration in which the top cover 720 is in contact with the front window glass 778 via the first heat-transfer member 790 and the second heat-transfer member 779 as illustrated in FIG. 10. Further, since the contact area of the second heat-transfer member (e.g., a graphite sheet) 779 and the front window glass 778 is wide, the heat in the first heat-transfer member 790 can diffuse in the surface direction of the front window glass 778 by the second heat-transfer member 799. The hardness of the first heat-transfer member 790 is lower than that of the window portion seal member 777. The sealability of the Peltier unit 200A can be secured by making the first heat-transfer member 790 softer than the window portion seal member 777. Further, when viewed in the Y direction, since the first heat-transfer member 790 and the second heat-transfer member 779 are arranged in the inner side of the window portion seal member 777, the second heat-transfer member 779 extends towards the center direction of the Peltier unit 200A (e.g., so that it is located near the center). Accordingly, the second heat-transfer member 779 can efficiently heat the center portion, or substantially near to the center portion, of the front window glass 778. The heat dissipation grease or the heat dissipation sheet as the first heat-transfer member 790 may desirably be silicone free to reduce the amount of the water vapor to enter into the Peltier unit 200A.

As described above, according to the present embodiment, it is possible to prevent condensation from occurring on the front window glass 778 facing the image sensor 750 without increasing the size of the imaging apparatus 10. In the descriptions above, the first heat-transfer member 790 and the second heat-transfer member 779 are separately described, but the first heat-transfer member 790 and the second heat-transfer member 779 are both heat-transfer members and thus may be collectively referred to as a heat-transfer member.

Next, with reference to FIG. 11, the imaging apparatus 10 including a Peltier unit 200B according to a third embodiment of the present disclosure will be described. The third embodiment is a modification example of the second embodiment. In the following descriptions, points different from the second embodiment will be described. The Peltier unit 200B according to the third embodiment is not provided with the first heat-transfer member 790 and the second heat-transfer member 779. More specifically, no heat-transfer member is provided in the gap G formed between an inner flange portion 729 of the top cover 720 and the front window glass 778.

Figure 11:
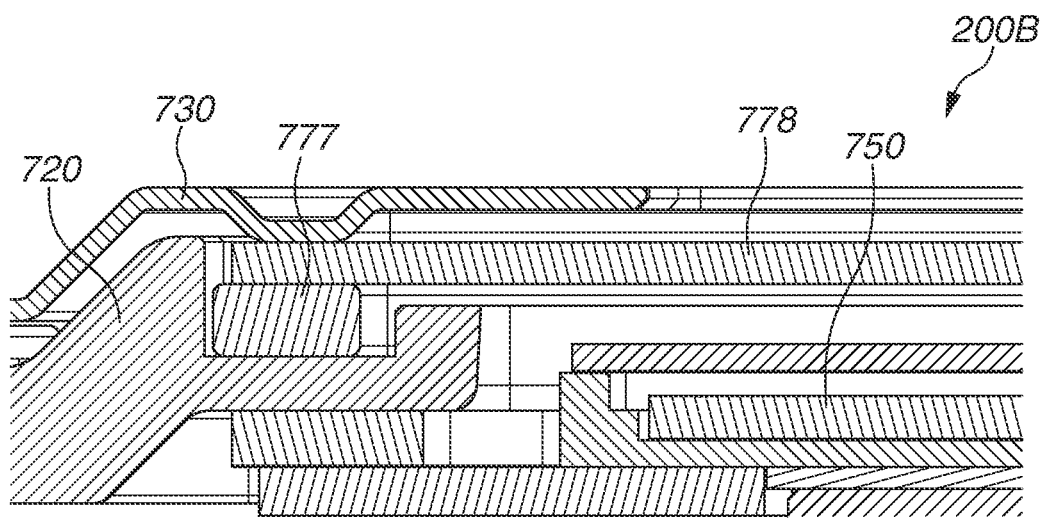
FIG. 11 is an enlarged view illustrating a cross-section of a portion around a front window glass of a Peltier unit according to a third embodiment.

In the third embodiment illustrated in FIG. 11, a material with high thermal conductivity is used for the window portion seal member 777 so as to transfer heat from the top cover 720 to the front window glass 778 via the window portion seal member 777. In the present embodiment, the window portion seal member 777 functions as a heat-transfer member. The window portion seal member 777 may be made of, for example, a highly thermally conductive elastomer. The window portion seal member 777 has a thermal conductivity of, for example, 1 W/m·K or higher. Further, the window portion seal member 777 also functions as an elastic member. Compared with the second embodiment, the present embodiment can reduce the cost because the first heat-transfer member 790 and the second heat-transfer member (e.g., graphite sheet) 779 are not used. In the third embodiment in which the second heat-transfer member (e.g., graphite sheet) 779 is not used, the heat-transfer efficiency may deteriorate as compared with the second embodiment, but it is sufficient as long as it is effective in preventing the occurrence of condensation on the front window glass 778.

In addition, the thickness of the window portion seal member 777 may be made larger than that in the second embodiment (FIG. 10). In this case, the heat-transfer efficiency reduces as compared with the configuration in FIG. 10, but it is sufficient as long as it is effective in preventing the occurrence of condensation onto the front window glass 778.

As described above, according to the present embodiment, it is possible to prevent condensation from occurring on the front window glass 778 facing the image sensor 750 without increasing the size of the imaging apparatus 10.

In addition, the configuration in FIG. 10 (second embodiment) and the configuration in FIG. 11 (third embodiment) may be combined as appropriate. For example, in the configuration in FIG. 10, a material having high thermal conductivity may be used for the window portion seal member 777. Further, in the configuration in FIG. 11, a graphite sheet may be provided inside the window portion seal member 777 (e.g., right side of the window portion seal member 777 in FIG. 11). More specifically, a graphite sheet may be attached to the front window glass 778 such that the graphite sheet extends from the window portion seal member 777 to the inner side of the Peltier unit 200B.

The embodiments according to the present disclosure are described above, but the present disclosure is not limited to the above-described embodiments, and the embodiments can be modified and changed in various manners within the gist of the present disclosure. For example, although the front window glass 278 and the front window glass 778 are each described to be made of a transparent glass material, a resin component such as transparent polycarbonate may be used for the front window glass 278 and the front window glass 778 as long as water does not enter into the hermetically sealed spaces of the Peltier units 200, 200A, and 200B. Further, if necessary, the front window glass 278 and the front window glass 778 may each be a transparent member with optical characteristics, such as a low-pass filter, a band-pass filter, or the like. The base portion seal member 276 and the window portion seal member 277 are described to be made of butyl rubber or fluoro rubber, but they may be made of other type of elastic body (e.g., silicone rubber) as long as the sealability of the Peltier units 200, 200A, and 200B can be secured. Further, as long as the sealability of the Peltier units 200, 200A, and 200B can be secured, the various seal members can be omitted. In FIG. 10, there are some cases where the second heat-transfer member (graphite sheet) 779 does not need to be provided. In this case, the first heat-transfer member 790 is configured to be in contact withs the front window glass 778.

Furthermore, a heat-conductive sheet or grease may be applied between the heat conductive components, such as between the Peltier element 271 and the bottom cover 210, in order to increase the thermal conductivity.

While the present disclosure has been described with reference to embodiments, it is to be understood that the disclosure is not limited to the disclosed embodiments. The scope of the following claims encompass all such modifications and equivalent structures and functions.

This application claims the benefit of Japanese Patent Application No. 2022-210298, filed Dec. 27, 2022, which is hereby incorporated by reference herein in its entirety.

What is claimed is:

1. An imaging apparatus comprising:
   an image sensor;
   a thermoelectric element thermally connected with the image sensor;
   a housing accommodating the image sensor and the thermoelectric element, having an opening at a position facing the image sensor, and thermally connected to the thermoelectric element;
   a light transmission member arranged on the opening of the housing to cover the opening of the housing;
   an attachment member configured to fix the light transmission member to the housing to attach the light transmission member to the housing;
   a heat-transfer member arranged between the attachment member and the light transmission member or between the housing and the light transmission member, and configured to transfer, to the light transmission member, heat transferred from the thermoelectric element to the housing; and
   an elastic member arranged in the housing and configured to support the light transmission member,
   wherein the light transmission member is arranged between the attachment member and the elastic member.

2. The imaging apparatus according to claim 1, wherein the heat-transfer member is a graphite sheet.

3. The imaging apparatus according to claim 1,
   wherein the heat-transfer member is arranged between the attachment member and the light transmission member,
   wherein the attachment member includes a contact portion arranged to be in contact with the heat-transfer member, and
   wherein the contact portion is located at a position on a surface of the light transmission member that corresponds to a position where the elastic member is arranged on an opposite surface of the light transmission member.

4. The imaging apparatus according to claim 3, wherein the heat-transfer member is configured to extend to a position nearer to an optical axis of the image sensor than the elastic member.

5. The imaging apparatus according to claim 3,
   wherein the attachment member has a light incident opening allowing light to enter the light transmission member and the image sensor, and
   wherein the heat-transfer member is configured to extend from the contact portion to the light incident opening.

6. The imaging apparatus according to claim 1,
   wherein the heat-transfer member is arranged between the housing and the light transmission member, and
   wherein the heat-transfer member includes heat dissipation grease.

7. The imaging apparatus according to claim 6, wherein the heat-transfer member includes a graphite sheet in addition to the heat dissipation grease.

8. The imaging apparatus according to claim 7, wherein the graphite sheet is configured to extend to a position nearer to an optical axis of the image sensor than the heat dissipation grease.

9. The imaging apparatus according to claim 6, wherein the heat-transfer member is arranged at a position nearer to an optical axis of the image sensor than the elastic member.

10. The imaging apparatus according to claim 1,
    wherein the heat-transfer member is arranged between the housing and the light transmission member, and
    wherein the heat-transfer member includes a heat dissipation sheet.

11. The imaging apparatus according to claim 10, wherein the heat-transfer member includes a graphite sheet in addition to the heat dissipation sheet.

12. The imaging apparatus according to claim 10, wherein the heat dissipation sheet is lower in hardness than the elastic member.

13. The imaging apparatus according to claim 10, wherein the heat-transfer member is arranged at a position nearer to an optical axis of the image sensor than the elastic member.

14. The imaging apparatus according to claim 1,
    wherein the heat-transfer member is arranged between the housing and the light transmission member, and
    wherein the heat-transfer member also functions as the elastic member.

* * * * *